(12) United States Patent
Wu et al.

(10) Patent No.: US 11,388,413 B1
(45) Date of Patent: Jul. 12, 2022

(54) FAST ENCODING PARAMETER SELECTION FOR CONVEX HULL VIDEO ENCODING

(71) Applicant: Meta Platforms, Inc., Menlo Park, CA (US)

(72) Inventors: Ping-Hao Wu, San Francisco, CA (US); Ioannis Katsavounidis, San Jose, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/084,031

(22) Filed: Oct. 29, 2020

Related U.S. Application Data

(60) Provisional application No. 63/060,315, filed on Aug. 3, 2020.

(51) Int. Cl.
*H04N 19/142* (2014.01)
*H04N 19/146* (2014.01)
*H04N 19/59* (2014.01)
*H04N 19/124* (2014.01)

(52) U.S. Cl.
CPC ......... *H04N 19/142* (2014.11); *H04N 19/124* (2014.11); *H04N 19/146* (2014.11); *H04N 19/59* (2014.11)

(58) Field of Classification Search
CPC .... H04N 19/142; H04N 19/59; H04N 19/124; H04N 19/146
See application file for complete search history.

(56) References Cited

U.S. PATENT DOCUMENTS

| | | | |
|---|---|---|---|
| 2006/0268985 A1* | 11/2006 | Liang | H04N 19/42 375/240.16 |
| 2010/0098173 A1* | 4/2010 | Horiuchi | H04N 19/124 375/240.18 |
| 2015/0373328 A1 | 12/2015 | Yenneti et al. | |
| 2017/0085872 A1 | 3/2017 | Perron et al. | |
| 2019/0028529 A1* | 1/2019 | Katsavounidis | H04N 19/132 |
| 2019/0132591 A1 | 5/2019 | Zhang et al. | |
| 2019/0379895 A1 | 12/2019 | Katsavounidis et al. | |
| 2020/0021847 A1 | 1/2020 | Kim et al. | |
| 2020/0304803 A1* | 9/2020 | Damnjanovic | H04N 19/33 |

* cited by examiner

*Primary Examiner* — Tracy Y. Li
(74) *Attorney, Agent, or Firm* — FisherBroyles, LLP

(57) ABSTRACT

The disclosed computer-implemented method may include downsampling and encoding one or more video segments into a plurality of encoded segments with a first encoder using a plurality of encoding parameter value sets and decoding and upsampling the plurality of encoded segments to a plurality of decoded segments at an original resolution of the one or more video segments. The method may also include determining, based on analyzing the plurality of decoded segments, an optimal encoding parameter value set for the one or more video segments. The method may further include encoding the one or more video segments with a second encoder using the optimal encoding parameter value set. Various other methods, systems, and computer-readable media are also disclosed.

20 Claims, 6 Drawing Sheets ual forms disclosed. Rather, the present disclosure covers all modifications, equivalents, and alternatives falling within the scope of the appended claims.
FAST ENCODING PARAMETER SELECTION FOR CONVEX HULL VIDEO ENCODING

CROSS REFERENCE TO RELATED APPLICATION

This application claims the benefit of U.S. Provisional Application No. 63/060,315, filed 3 Aug. 2020, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
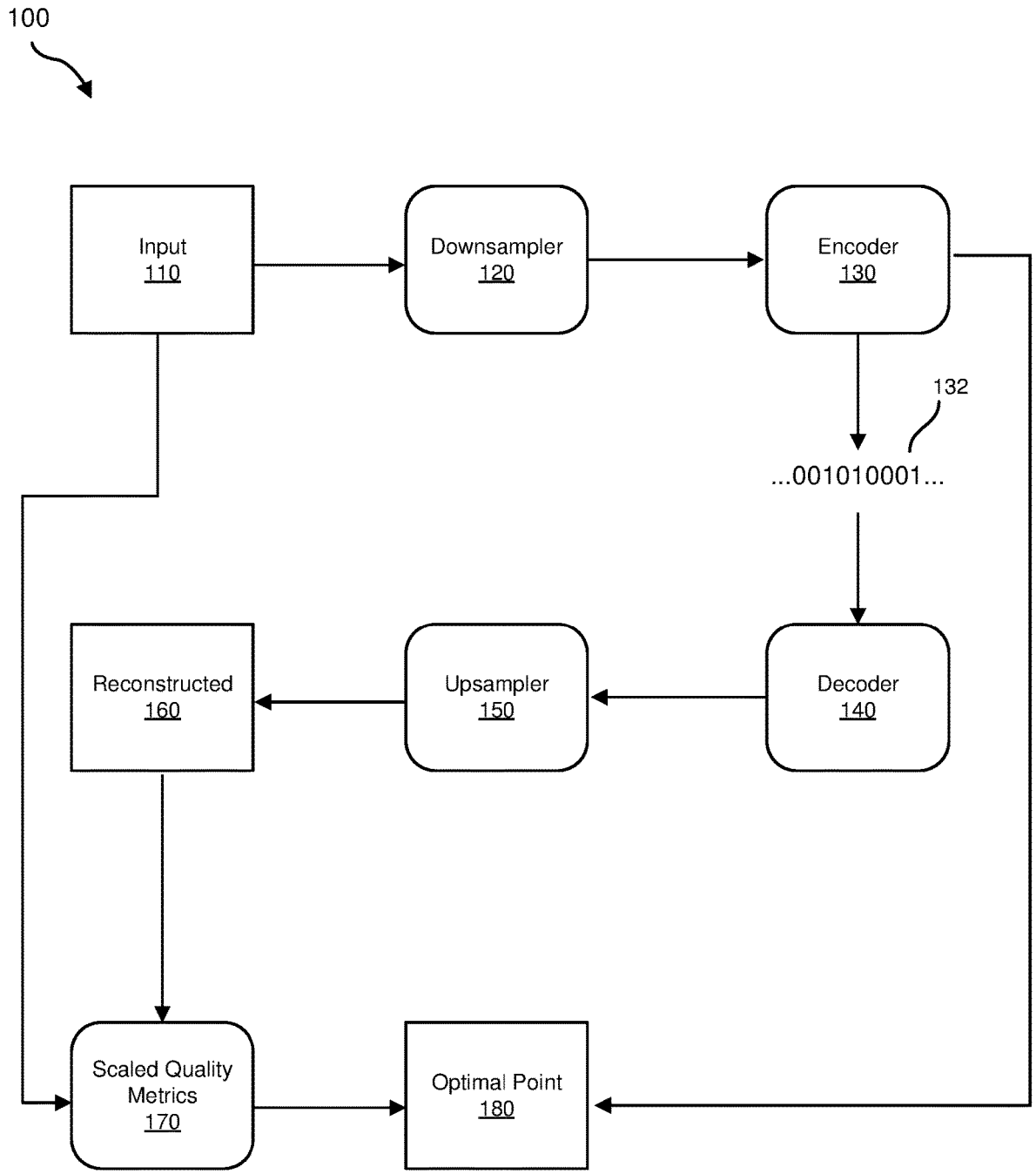
FIG. 1 is a flow diagram of an exemplary process of convex hull video encoding.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Video streaming typically requires a sufficiently fast and stable network connection for uninterrupted streaming or to otherwise minimize buffering. However, due to network conditions and various other factors, the available bandwidth for video streaming may vary. In an attempt to improve video streaming performance, media providers may use adaptive video streaming. Adaptive video streaming may improve video streaming performance by adapting the delivered video based on a user's screen size, network bandwidth, etc. For example, if the user's network speed is reduced during a stream, the media provider may adapt by delivering a lower resolution video so that the user may download at the reduced speed without requiring buffering.

With the increasing use of adaptive video streaming, which requires multiple encoded versions of a source video, compression efficiency is a major consideration. Although advancements in video codecs have improved compression efficiency, such improved compression efficiency may require significant increase in computational complexity. For example, a dynamic optimizer framework may provide optimal encoding of multi-shot video sequences by splitting the video sequences into shots, applying constant-quality encoding within each shot, and combining the encoded shots. However, the encoding complexity may be significantly multiplied because each shot of the video sequence may be encoded multiple times, and higher quality encodings may require longer encoding times. Although various encoding parameters may be adjusted to reduce encoding times, such adjustments may result in suboptimal video quality at certain desired video resolutions.

The present disclosure is generally directed to fast encoding parameter selection for convex hull video encoding. As will be explained in greater detail below, embodiments of the present disclosure may encode a video using a fast encoder, analyze the encoded video to determine optimal encoding parameter values, and encode the video using a slow encoder with the optimal encoding parameter values. The system described herein may improve the dynamic optimizer framework by more efficiently determining optimal encoding parameters by using a faster encoder to predict optimal encoding parameters and finally encoding the video using a slower encoder, applying the determined parameters. The system may improve the functioning of a computing device by determining optimal encoding parameter values that may reduce processing overhead for encoding videos. The system may further improve adaptive streaming technology by achieving faster overall encoding times while maintaining a desired level of video quality.

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 2:
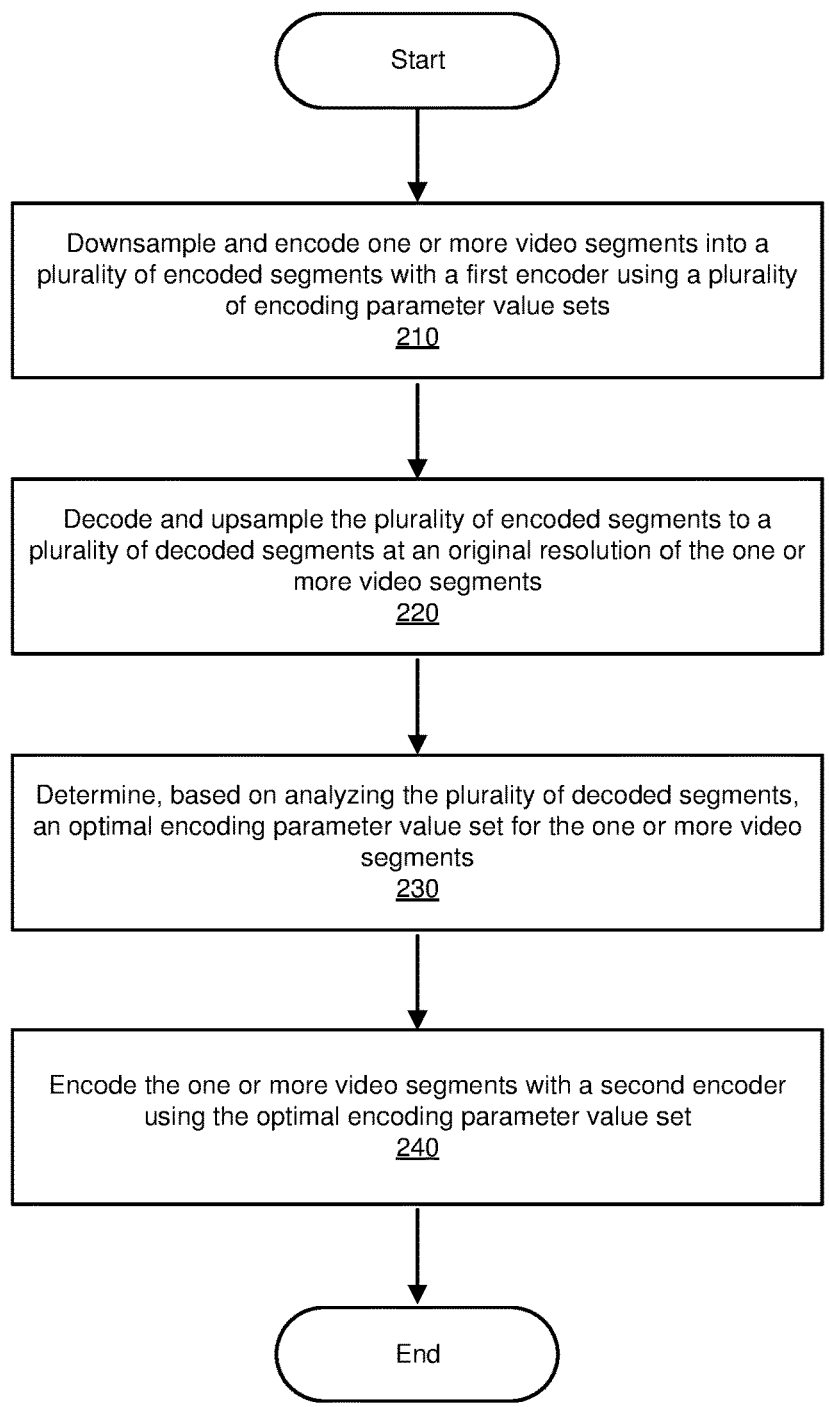
FIG. 2 is a flow diagram of an exemplary method for fast encoding parameter selection for convex hull video encoding.
Figure 3:
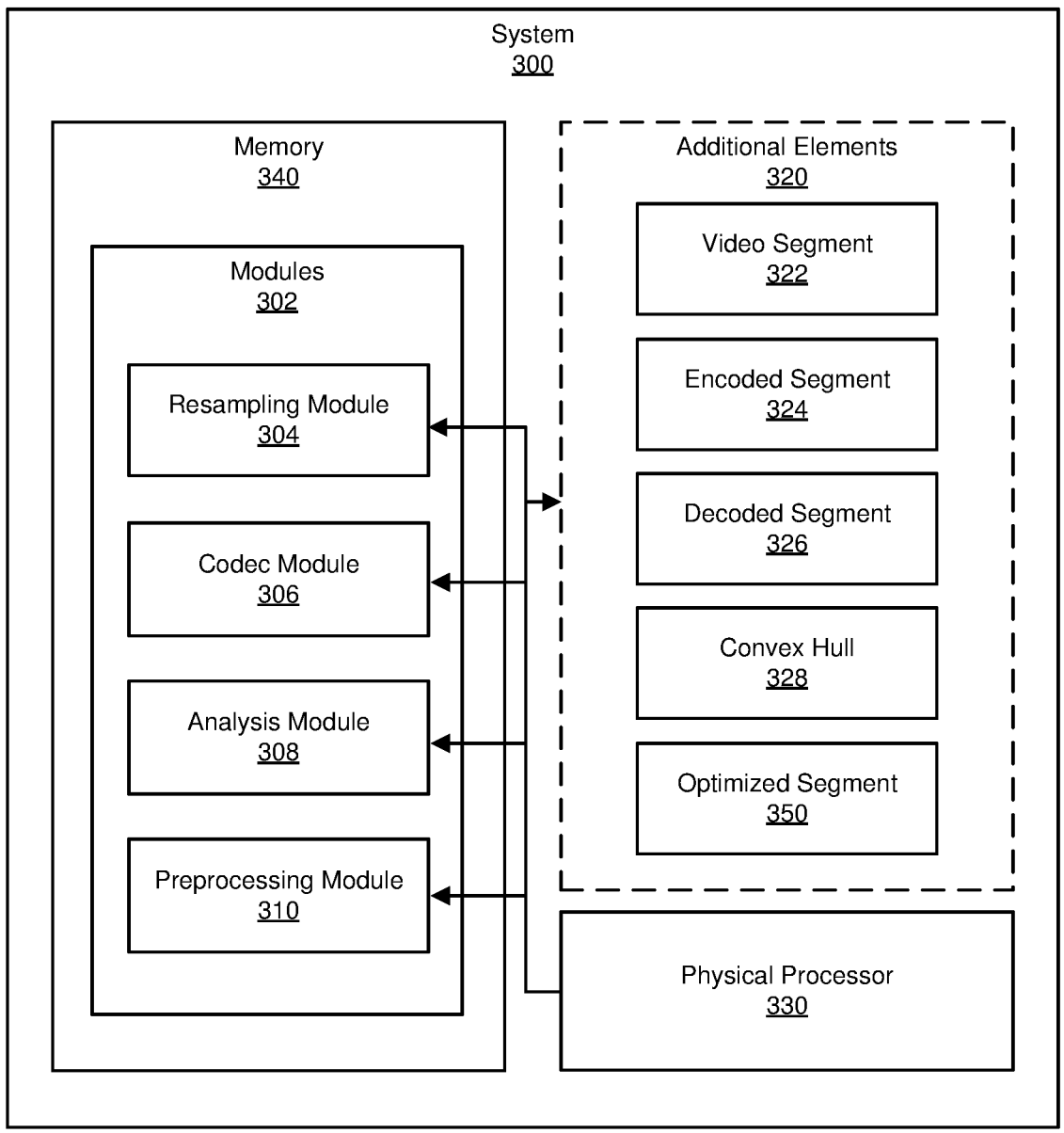
FIG. 3 is a block diagram of an exemplary system for fast encoding parameter selection for convex hull video encoding.
Figure 4:
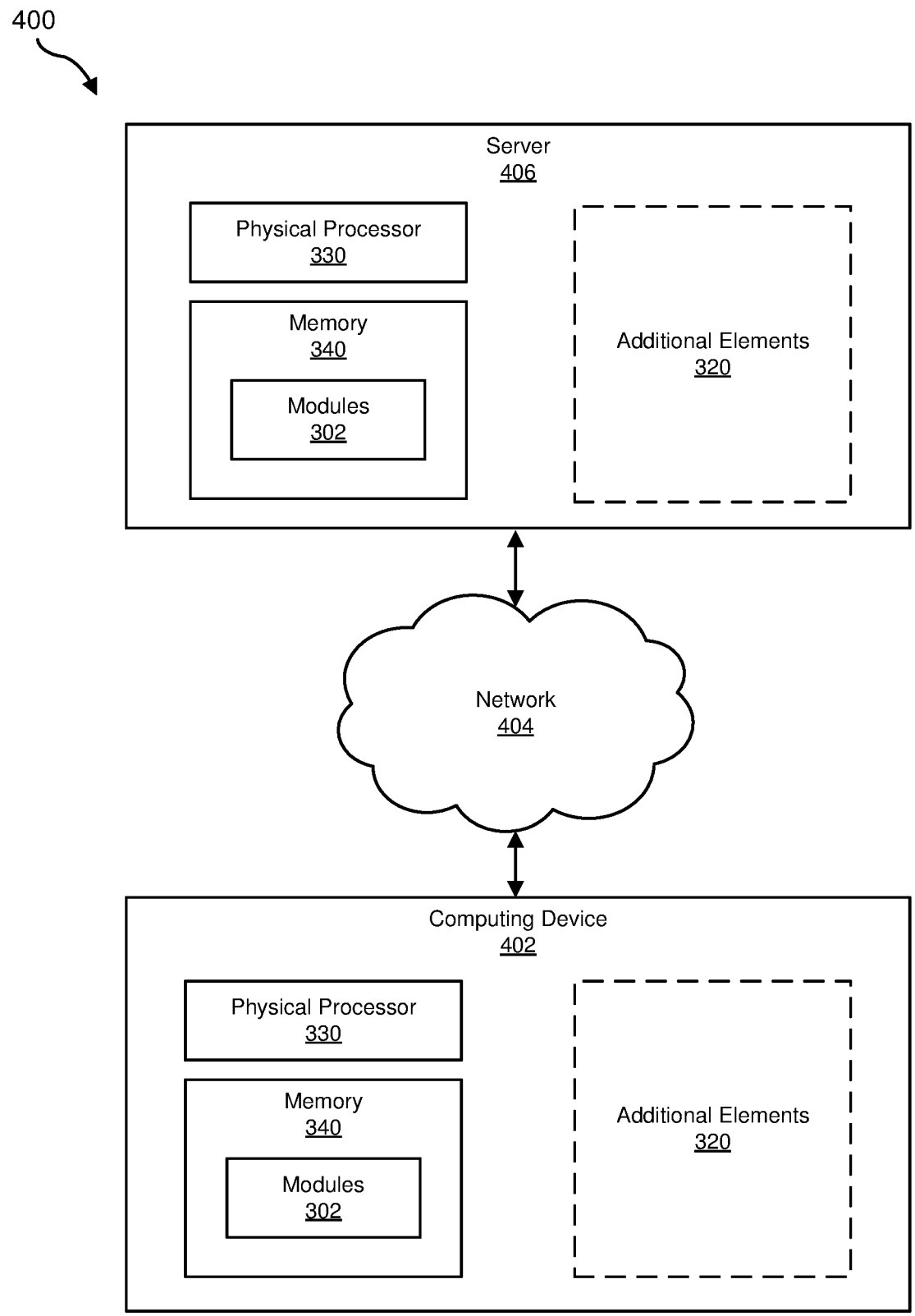
FIG. 4 is a block diagram of an exemplary network for fast encoding parameter selection for convex hull video encoding.
Figure 5:
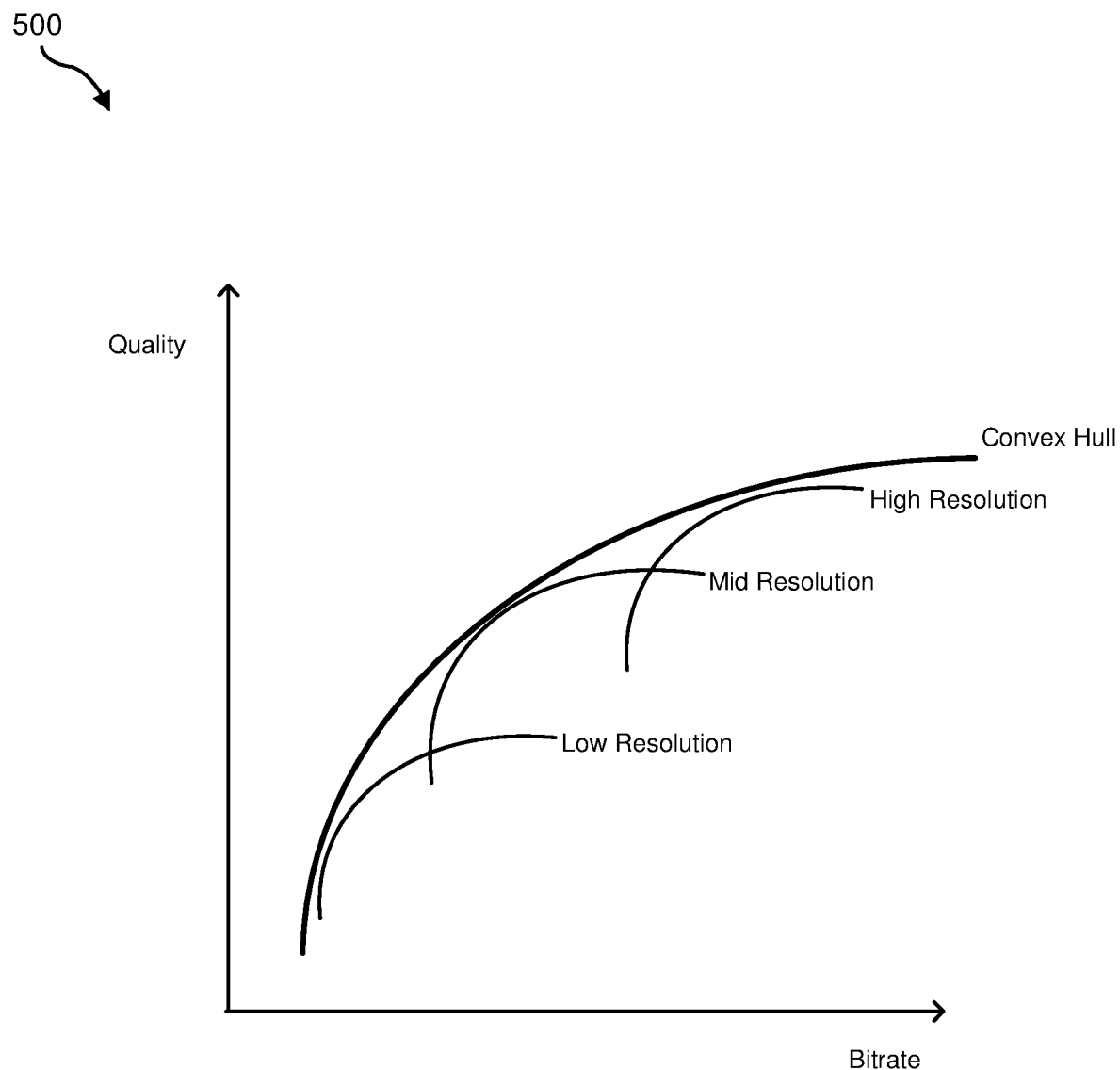
FIG. 5 is a graph depicting a convex hull for video encoding.
Figure 6:
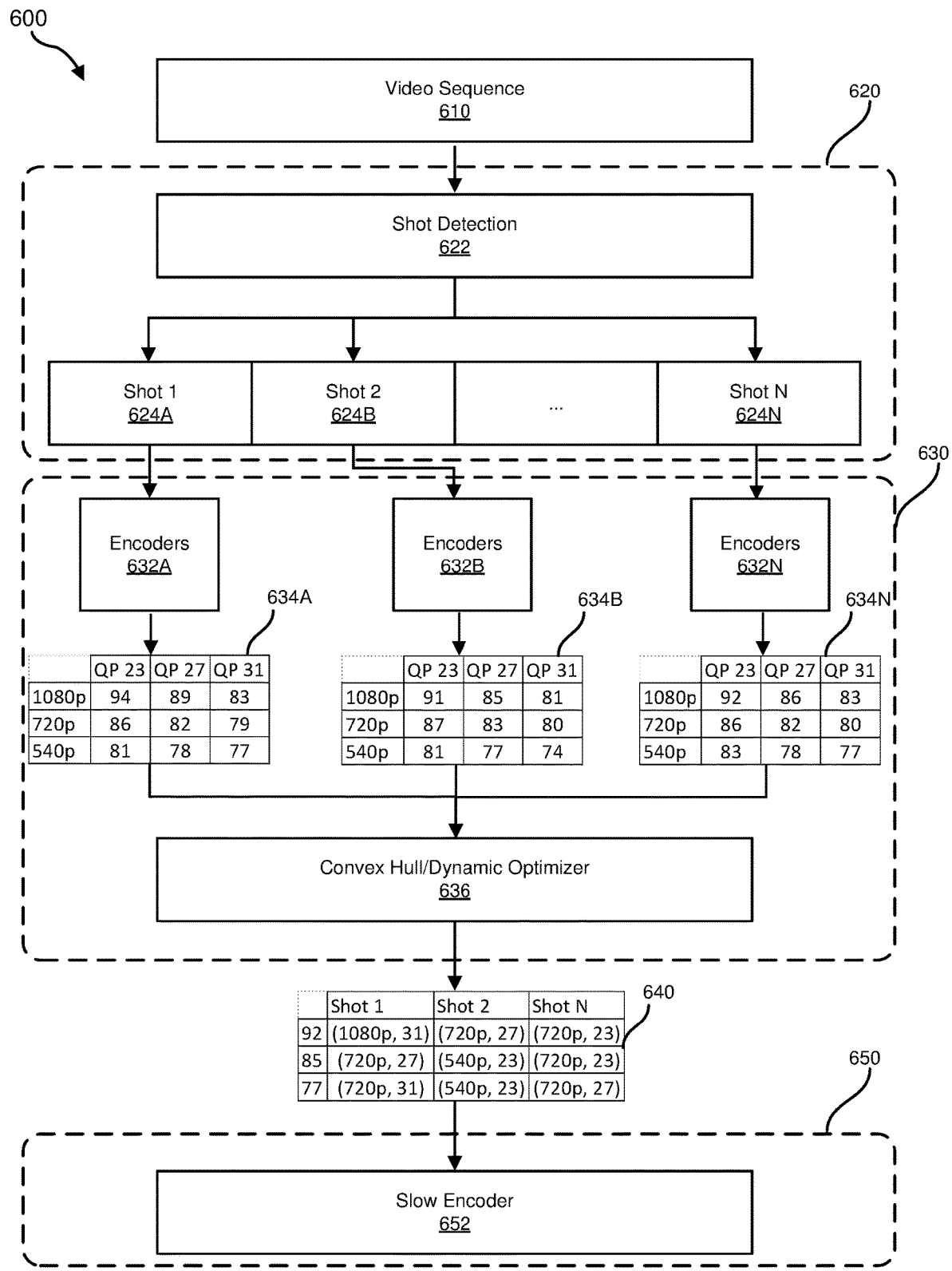
FIG. 6 is a flow diagram of an exemplary process of convex hull video encoding using fast encoding parameter selection.

The following will provide, with reference to FIGS. 1-6, detailed descriptions of systems and methods for fast encoding parameter selection for convex hull video encoding. FIG. 1 illustrates an exemplary process of convex hull video encoding. FIG. 2 illustrates an exemplary process for fast encoding parameter selection. FIG. 3 illustrates an exemplary system for fast encoding parameter selection. FIG. 4 illustrates an exemplary network environment. FIG. 5 illustrates a graph depicting a convex hull for video encoding. FIG. 6 illustrates an exemplary process for fast encoding parameter selection for convex hull video encoding.

FIG. 1 is a flow diagram of an exemplary computer-implemented process 100 for convex hull video encoding. The steps shown in FIG. 1 may be performed by any suitable computer-executable code and/or computing system, including the system(s) illustrated in FIGS. 3 and 4. In one example, each of the steps shown in FIG. 1 may represent an algorithm whose structure includes and/or is represented by multiple sub-steps, examples of which will be provided in greater detail below.

As illustrated in FIG. 1, at input 110, a video file may be received. The video file may be preprocessed (e.g., split from a larger video file). As will be explained further below, the original video file may be used for analysis. At downsampler 120, the video file may be downsampled to a resolution lower than that of the original video file. At encoder 130, the downsampled video file may be encoded to an encoded video file 132 using an initial set of encoding parameter values. As will be further explained below, the initial set of encoding parameter values may be used for analysis.

Encoded video file 132 may be decoded at decoder 140, upsampled at upsampler 150 back to the original resolution, and reconstructed at reconstructed 160 (e.g., reversing the preprocessing done at input 110). The reconstructed video file may be compared with the original video file at scaled quality metrics 170, for example to determine a loss of quality in the reconstructed video file as compared to the original video file. At optimal point 180, optimal encoding parameters for encoder 130 may be determined, for example, by finding a convex hull from scaled quality metrics 170.

FIG. 2 is a flow diagram of an exemplary computer-implemented method 200 for fast encoding parameter selection for convex hull video encoding. The steps shown in FIG. 2 may be performed by any suitable computer-executable code and/or computing system, including the system(s) illustrated in FIGS. 3 and/or 4. In one example, each of the steps shown in FIG. 2 may represent an algorithm whose structure includes and/or is represented by multiple sub-steps, examples of which will be provided in greater detail below.

As illustrated in FIG. 2, at step 210 one or more of the systems described herein may downsample and encode one or more video segments into a plurality of encoded segments with a first encoder using a plurality of encoding parameter value sets. For example, a resampling module 304 in a system 300 as shown in FIG. 3 may downsample a video segment 322 and a codec module 306 may encode downsampled video segment 322 into an encoded segment 324 with the first encoder using an initial set of encoding parameter values.

In some embodiments, the term "downsampling" may refer to a sample-rate reduction. Examples of downsampling include, without limitation, compression, decimation, and other sample-rate reductions.

In some embodiments, the term "resampling" may refer to a sample-rate conversion that may correspond to changing a sampling rate of a discrete signal to a different discrete representation of the underlying continuous signal. Examples of resampling include, without limitations, upsampling, downsampling, upscaling, downscaling, sampling-frequency conversion, decimation, interpolation, etc.

Various systems described herein may perform step 210. FIG. 3 is a block diagram of an example system 300 for fast encoding parameter selection. As illustrated in this figure, example system 300 may include one or more modules 302 for performing one or more tasks. As will be explained in greater detail herein, modules 302 may include resampling module 304, codec module 306, an analysis module 308, and a preprocessing module 310. Although illustrated as separate elements, one or more of modules 302 in FIG. 3 may represent portions of a single module or application implemented in hardware and/or software. For example, resampling module 304 may include a scaler that may resize uncompressed video. Codec module 306 may include a decoder that may accept an uploaded video and output an uncompressed raw video stream. Codec module 306 may also include an encoder that may output encoded or compressed video. Analysis module 308 may include quality measurement logic for measuring degradation in video quality after encoding.

In certain embodiments, one or more of modules 302 in FIG. 3 may represent one or more software applications or programs that, when executed by a computing device, may cause the computing device to perform one or more tasks. For example, and as will be described in greater detail below, one or more of modules 302 may represent modules stored and configured to run on one or more computing devices, such as the devices illustrated in FIG. 4 (e.g., computing device 402 and/or server 406). One or more of modules 302 in FIG. 3 may also represent all or portions of one or more special-purpose computers configured to perform one or more tasks.

As illustrated in FIG. 3, example system 300 may also include one or more memory devices, such as memory 340. Memory 340 generally represents any type or form of volatile or non-volatile storage device or medium capable of storing data and/or computer-readable instructions. In one example, memory 340 may store, load, and/or maintain one or more of modules 302. Examples of memory 340 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 3, example system 300 may also include one or more physical processors, such as physical processor 330. Physical processor 330 generally represents any type or form of hardware-implemented processing unit capable of interpreting and/or executing computer-readable instructions. In one example, physical processor 330 may access and/or modify one or more of modules 302 stored in memory 340. Additionally or alternatively, physical processor 330 may execute one or more of modules 302 to facilitate maintain the mapping system. Examples of physical processor 330 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 3, example system 300 may also include one or more additional elements 320, such as video segment 322, encoded segment 324, a decoded segment 326, a convex hull 328, and an optimized segment 350. Video segment 322, encoded segment 324, decoded segment 326, convex hull 328, and/or optimized segment 350 may be stored on a local storage device, such as memory 340, or may be accessed remotely. Video segment 322 may represent video data, as will be explained further below. Encoded segment 324 may represent an encoded version of video segment 322, as will be explained further below. Decoded segment 326 may represent a decoded version of encoded segment 324, as will be explained further below. Convex hull 328 may represent analysis results of encoding, as will be explained further below. Optimized segment 350 may represent an optimized encoding of video segment 322, as will be explained further below.

Example system 300 in FIG. 3 may be implemented in a variety of ways. For example, all or a portion of example system 300 may represent portions of example network environment 400 in FIG. 4.

FIG. 4 illustrates an exemplary network environment 400 implementing aspects of the present disclosure. The network environment 400 includes computing device 402, a network 404, and server 406. Computing device 402 may be a client device or user device, such as a smartphone, a desktop computer, laptop computer, tablet device, or other computing device. Computing device 402 may include a physical processor 330, which may be one or more processors, and memory 340, which may store data such as one or more of additional elements 320 and/or modules 302.

Server 406 may represent or include one or more servers capable of hosting video data. Server 406 may provide the hosted video data to computing devices such as computing device 402. Server 406 may include a physical processor 330, which may include one or more processors, memory 340, which may store modules 302, and one or more of additional elements 320.

Computing device 402 may be communicatively coupled to server 406 through network 404. Network 404 may represent any type or form of communication network, such as the Internet, and may comprise one or more physical connections, such as LAN, and/or wireless connections, such as WAN.

Returning to FIG. 2, the systems described herein may perform step 210 in a variety of ways. In one example, the encoding parameter value sets may include initial and/or default values that may correspond to a fast encoder. A fast encoder may be a video encoder configured to prioritize fast encoding times, for instance by reducing computational complexity.

In some examples, video segment 322 may have previously been preprocessed by preprocessing module 310 prior to the downsampling. For instance, video segment 322 may be a portion of a larger source video file. In such examples, method 200 may further include dividing a source video into one or more video segments such as video segment 322. For instance, preprocessing module 310 may divide the source video into video segments based on detecting a shot change in the source video. In such examples, each video segment, such as video segment 322, may correspond to a discrete shot from the source video. Preprocessing module 310 may detect shot changes based on, for example, detecting a black or blank screen, a static screen, or other measurable break in the source video. The steps of method 200 may be applied to each of the one or more video segments. Alternatively, video segment 322 may include more than one video segment from the source video.

Preprocessing module 310 may perform other preprocessing steps, as needed. For example, preprocessing module 310 may format or reformat the source video, gather metadata and/or other characteristics and properties of the source video, and otherwise prepare the source video for processing and analysis as described herein.

In some examples, resampling module 304 may downsample video segment 322 into a plurality of downsampled segments based on a plurality of target resolutions. The target resolutions may include desired video resolutions (e.g., 1080p, 720p, 540p) that may correspond to final resolutions used for adaptive video streaming, resolutions useful for analysis, resolutions corresponding to optimal performance, etc. Codec module 306 may then encode the downsampled segments into the plurality of encoded segments with the first encoder using the plurality of encoding parameter value sets. For example, encoded segment 324 may include video segment 322 encoded into the target resolutions using the fast encoder.

At step 220 one or more of the systems described herein may decode and upsample the plurality of encoded segments to a plurality of decoded segments at an original resolution of the one or more video segments. For example, codec module 306 may decode encoded segment 324 and resampling module 304 may upsample, to an original resolution of video segment 322, the decoded encoded segment 324 into decoded segment 326.

In some embodiments, the term "upsample" may refer to an increase of sample rate corresponding to sampling an underlying signal at a higher rate. Examples of upsampling include, without limitation, expansion, interpolation, and other increases of sample rate.

The systems described herein may perform step 220 in a variety of ways. In one example, codec module 306 may decode each video segment of encoded segment 324 using a decoder corresponding to the fast encoder. Each of these decoded segments may be upsampled to the original resolution of video segment 322 such that decoded segment 326 may include one or more video segments corresponding to the various target resolutions. However, the video segments of decoded segment 326 may all share the same resolution as video segment 322.

At step 230 one or more of the systems described herein may determine, based on analyzing the plurality of decoded segments, an optimal encoding parameter value set for the one or more video segments. For example, analysis module 308 may analyze decoded segment 326 and based on the analysis, determine optimal encoding parameter values for video segment 322.

Although decoded segment 326 includes video segments that may share the same resolution as video segment 322, decoded segment 326 may not be an exact duplicate of video segment 322. The encoding and decoding process may not be lossless such that some data or information may have been lost from original video segment 322, and artifacts or other noise may have been introduced.

The systems described herein may perform step 230 in a variety of ways. In one example, analysis module 308 may calculate a quality and a bitrate for each of the plurality of decoded segments. For instance, analysis module 308 may calculate the quality of decoded segment 326 by determining an amount of degradation from video segment 322. Analysis module 308 may determine a convex hull for the one or more video segments.

In some embodiments, the term "convex hull" may refer to the smallest convex set containing a set of points. For example, analysis module 308 may analyze decoded segment 326 on a quality-bitrate plane as seen in graph 500 in FIG. 5. As seen in FIG. 5, for a given resolution, increasing the bitrate may increase quality until reaching diminishing returns or a plateau. However, each resolution may include a bitrate region which outperforms (e.g. exhibits higher quality than) other resolutions at that bitrate region. The convex hull may include these bitrate regions for the various resolutions as illustrated in FIG. 5. Thus, the convex hull may correspond to performance boundaries for bitrates for various resolutions.

Analysis module 308 may determine the optimal encoding parameter value set for video segment 322 based on the convex hull. Analysis module 308 may determine encoding parameter values that may result in video performance on or near the convex hull as illustrated in FIG. 5. For example, analysis module 308 may determine values for a quantization parameter (QP) and a resolution. The QP may correspond to bitrate or other sampling metric and may further correlate to computational complexity. In other examples, the optimal encoding parameter value set may include values for other encoding parameters. In some examples, analysis module 308 may normalize the optimal encoding parameter value set or otherwise prepare the optimal encoding parameter value set for conversion to different scales. For instance, analysis module 308 may determine the optimal encoding parameter values for the fast encoder. Analysis module 308 may need to convert these values to a different scale for use with another encoder.

Returning to FIG. 2, at step 240 one or more of the systems described herein may encode the one or more video segments with a second encoder using the optimal encoding parameter value set. For example, codec module 306 may encode video segment 322 into optimized segment 350 with a second encoder using the optimal encoding parameter values.

The systems described herein may perform step 240 in a variety of ways. In one example, the first encoder and the second encoder may each correspond to different video codecs. For example, the first encoder may be the fast encoder and the second encoder may be a slow encoder. The slow encoder may produce higher quality video than the fast encoder but may involve a higher computational complexity than that of the first encoder such that the slow encoder may require longer encoding times than the fast encoder. Alternatively, the second encoder may correspond to the same video codec as the first encoder that has been adjusted for a higher computational complexity than that of the first encoder. In addition, analysis module 308 may map parameter values from the first encoder to corresponding values for the second encoder. By using the fast encoder rather than the slow encoder for analysis, overall processing time may be reduced.

Although method 200 is described with respect to video segment 322, method 200 or portions thereof may be repeated based on a number of video segments, target resolutions, etc. because each source video may include different requirements. In addition, in certain examples, the optimal encoding parameter value set may be reused for other video segments, used as an additional analysis input, and/or updated as needed.

FIG. 6 shows a flow diagram of a process 600 of an example fast encoding parameter selection for convex hull video encoding. The steps of process 600 may be performed by any system described herein, including system 300 and/or server 406. A video sequence 610 may undergo a preprocessing stage 620, an analysis stage 630, and an encoding stage 650. During preprocessing stage 620, video sequence 610 may undergo shot detection 622 to split video sequence into various shots, such as shot 1 624A, shot 2 624B, . . . shot N 624N.

During analysis stage 630, each shot may undergo downsampling, encoding, decoding, upsampling, and convex hull analysis. For example, shot 1 624A may be encoded/decoded by encoders 632A to determine convex hull 634A, shot 2 624B may be encoded/decoded by encoders 632B to determine convex hull 634B, and shot N 624N may be encoded/decoded by encoders 632N to determine convex hull 634N. Encoders 632A-N may each be fast encoders and may be the same encoder, or different encoders. As depicted in FIG. 6, the convex hulls 634A-N may indicate performance boundaries associated with a particular resolution (e.g., 1080p) and a particular parameter (e.g., a specific value for QP).

Convex hull/dynamic optimizer 636 may further analyze the convex hulls for each shot to determine optimal parameters 640 for each shot at various target resolutions. Convex hull/dynamic optimizer 636 may not necessarily select absolute maximal values for optimal parameters 640 but rather close estimates. Selecting the absolute maximal values may require a prohibitive compute cost (e.g., requiring multiple slow encodes). Convex hull/dynamic optimizer 636 may determine optimal parameters 640 in a fraction of the compute cost. As depicted in FIG. 6, optimal parameters 640 may include best fit values from convex hulls 634A-N rather than specific values.

During encoding stage 650, slow encoder 652 may encode the shots using optimal parameters 640. Each shot may be encoded into every target resolution. Using adaptive video streaming, an appropriate resolution for the shots may be delivered to a user.

A hardware video encoder may be significantly more density and power efficient than a software video encoder. However, due to the lower flexibility that the hardware video encoder provides compared to the software video encoder, the compression efficiency of the hardware video encoder may be lower than that of the software video encoder. Reducing the computational complexity of encoding may improve the compression efficiency at the cost of reducing output video quality.

Modern video encoders, including hardware and software encoders, may provide various parameters to enable/disable or otherwise adjust computational complexity. As described herein, the convex hull analysis of a source video may indicate optimal parameter values corresponding to optimal resolution and QP values for each shot of the source video for a given encoder. The systems and methods herein may use these optimal parameter values for a different encoder. Although the optimal parameter values may not correspond to actual optimal parameter values for other encoders, the optimal parameter values may be sufficiently close and advantageously may not require another convex hull analysis that may be computationally cost prohibitive for computationally complex encoders. In other words, performing the convex hull analysis on a less computationally complex encoder may realize significant processing cost reduction compared to the convex hull analysis on a more computationally complex encoder without significant reduction in output video quality.

The fast encoding parameter selection may include performing shot detection and splitting a video sequence into multiple shots. Each shot may be downsampled and encoded using a faster encoder or faster setting for an encoder, at M different resolutions and N different QP values. Each encode may be decoded and upsampled back to the original resolution of the video sequence for metrics calculation. The convex hull may be determined for each shot. The optimal selection of encoding parameters (e.g., resolution and QP) may be determined for each shot at a desired certain average quality level. The optimal encoding parameters may be directly applied using a slower encoder or slower encoder setting to encode the shots. This method may advantageously provide fast selection of encoding parameters.

EXAMPLE EMBODIMENTS

Example 1: A computer-implemented method for fast encoding parameter selection for convex hull video encoding may include downsampling and encoding one or more video segments into a plurality of encoded segments with a first encoder using a plurality of encoding parameter value sets; decoding and upsampling the plurality of encoded segments to a plurality of decoded segments at an original resolution of the one or more video segments; determining, based on analyzing the plurality of decoded segments, an optimal encoding parameter value set for the one or more video segments; and encoding the one or more video segments with a second encoder using the optimal encoding parameter value set.

Example 2: The computer-implemented method of Example 1, further comprising dividing a source video into the one or more video segments.

Example 3: The computer-implemented method of Example 2, wherein dividing the source video into the one or more video segments is based on detecting a shot change in the source video.

Example 4: The computer-implemented method of any of Examples 1-3, wherein the first encoder and the second encoder each correspond to different video codecs.

Example 5: The computer-implemented method of any of the above Examples, wherein the first encoder and the second encoder each correspond to the same video codec and the second encoder corresponds to the video codec adjusted for a higher computational complexity than that of the first encoder.

Example 6: The computer-implemented method of any of the above Examples, wherein the optimal encoding parameter value set includes values for a quantization parameter (QP) and a resolution.

Example 7: The computer-implemented method of any of the above Examples, wherein determining the optimal encoding parameter value set comprises mapping parameter values from the first encoder to corresponding parameter values for the second encoder.

Example 8: The computer-implemented method of any of the above Examples, wherein downsampling and encoding the one or more video segments comprises: downsampling the one or more video segments into a plurality of downsampled segments based on a plurality of target resolutions; and encoding the plurality of downsampled segments into the plurality of encoded segments with the first encoder using the plurality of encoding parameter value sets.

Example 9: The computer-implemented method of any of the above Examples, wherein analyzing the plurality of decoded segments comprises: calculating a quality and a bitrate for each of the plurality of decoded segments; and determining, by analyzing the plurality of decoded segments on a quality-bitrate plane, a convex hull for the one or more video segments, wherein the convex hull corresponds to performance boundaries for bitrates.

Example 10: The computer-implemented method of Example 9, wherein the optimal encoding parameter value set for the one or more video segments is determined based on the convex hull.

Example 11: A system comprising: at least one physical processor; physical memory comprising computer-executable instructions that, when executed by the physical processor, cause the physical processor to: downsample and encode one or more video segments into a plurality of encoded segments with a first encoder using a plurality of encoding parameter value sets; decode and upsample the plurality of encoded segments to a plurality of decoded segments at an original resolution of the one or more video segments; determine, based on analyzing the plurality of decoded segments, an optimal encoding parameter value set for the one or more video segments; and encode the one or more video segments with a second encoder using the optimal encoding parameter value set.

Example 12: The system of Example 11, wherein the first encoder and the second encoder each correspond to different video codecs.

Example 13: The system of any of Examples 11 and 12, wherein the first encoder and the second encoder each correspond to the same video codec and the second encoder corresponds to the video codec adjusted for a higher computational complexity than that of the first encoder.

Example 14: The system of any of Examples 11-13, wherein determining the optimal encoding parameter value set comprises mapping parameter values from the first encoder to corresponding parameter values for the second encoder.

Example 15: The system of any of Examples 11-14, wherein analyzing the plurality of decoded segments comprises: calculating a quality and a bitrate for each of the plurality of decoded segments; and determining, by analyzing the plurality of decoded segments on a quality-bitrate plane, a convex hull for the one or more video segments, wherein the convex hull corresponds to performance boundaries for bitrates; wherein the optimal encoding parameter value set for the one or more video segments is determined based on the convex hull.

Example 16: A non-transitory computer-readable medium comprising one or more computer-executable instructions that, when executed by at least one processor of a computing device, cause the computing device to: downsample and encode one or more video segments into a plurality of encoded segments with a first encoder using a plurality of encoding parameter value sets; decode and upsample the plurality of encoded segments to a plurality of decoded segments at an original resolution of the one or more video segments; determine, based on analyzing the plurality of decoded segments, an optimal encoding parameter value set for the one or more video segments; and encode the one or more video segments with a second encoder using the optimal encoding parameter value set.

Example 17: The non-transitory computer-readable medium of Example 16, wherein the first encoder and the second encoder each correspond to different video codecs.

Example 18: The non-transitory computer-readable medium of any of Examples 16 and 17, wherein the first encoder and the second encoder each correspond to the same video codec and the second encoder corresponds to the video codec adjusted for a higher computational complexity than that of the first encoder.

Example 19: The non-transitory computer-readable medium of any of Examples 16-18, wherein determining the optimal encoding parameter value set comprises mapping parameter values from the first encoder to corresponding parameter values for the second encoder.

Example 20: The non-transitory computer-readable medium of any of Examples 16-19, wherein analyzing the plurality of decoded segments comprises: calculating a quality and a bitrate for each of the plurality of decoded segments; and determining, by analyzing the plurality of decoded segments on a quality-bitrate plane, a convex hull for the one or more video segments, wherein the convex hull corresponds to performance boundaries for bitrates; wherein the optimal encoding parameter value set for the one or more video segments is determined based on the convex hull.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive video data to be transformed, transform the video data, output a result of the transformation to determine a convex hull, use the result of the transformation to determine optimal encoding parameter values, and store the result of the transformation to encode the video data. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    downsampling and encoding one or more video segments into a plurality of encoded segments with a first encoder using a plurality of encoding parameter value sets;
    decoding and upsampling the plurality of encoded segments to a plurality of decoded segments at an original resolution of the one or more video segments;
    analyzing the plurality of decoded segments by determining an amount of degradation from the one or more video segments;
    determining, for the first encoder based on the analysis of the plurality of decoded segments and corresponding video performance of the first encoder, an optimal encoding parameter value set of the first encoder for the one or more video segments; and
    encoding the one or more video segments with a second encoder using the optimal encoding parameter value set of the first encoder, wherein the second encoder performs a different encoding than the first encoder.

2. The method of claim 1, further comprising dividing a source video into the one or more video segments.

3. The method of claim 2, wherein dividing the source video into the one or more video segments is based on detecting a shot change in the source video.

4. The method of claim 1, wherein the first encoder and the second encoder each correspond to different video codecs.

5. The method of claim 1, wherein the first encoder and the second encoder each correspond to the same video codec and the second encoder corresponds to the video codec adjusted for a higher computational complexity than that of the first encoder.

6. The method of claim 1, wherein the optimal encoding parameter value set includes values for a quantization parameter (QP) and a resolution.

7. The method of claim 1, wherein determining the optimal encoding parameter value set comprises mapping parameter values from the first encoder to corresponding parameter values for the second encoder.

8. The method of claim 1, wherein downsampling and encoding the one or more video segments comprises:
    downsampling the one or more video segments into a plurality of downsampled segments based on a plurality of target resolutions; and encoding the plurality of downsampled segments into the plurality of encoded segments with the first encoder using the plurality of encoding parameter value sets.

9. The method of claim 1, wherein analyzing the plurality of decoded segments comprises:
calculating a quality and a bitrate for each of the plurality of decoded segments; and
determining, by analyzing the plurality of decoded segments on a quality-bitrate plane, a convex hull for the one or more video segments, wherein the convex hull corresponds to performance boundaries for bitrates.

10. The method of claim 9, wherein the optimal encoding parameter value set for the one or more video segments is determined based on the convex hull.

11. A system comprising:
at least one physical processor;
physical memory comprising computer-executable instructions that, when executed by the physical processor, cause the physical processor to:
downsample and encode one or more video segments into a plurality of encoded segments with a first encoder using a plurality of encoding parameter value sets;
decode and upsample the plurality of encoded segments to a plurality of decoded segments at an original resolution of the one or more video segments;
analyze the plurality of decoded segments by determining an amount of degradation from the one or more video segments;
determine, for the first encoder based on the analysis of the plurality of decoded segments and corresponding video performance of the first encoder, an optimal encoding parameter value set of the first encoder for the one or more video segments; and
encode the one or more video segments with a second encoder using the optimal encoding parameter value set of the first encoder, wherein the second encoder performs a different encoding than the first encoder.

12. The system of claim 11, wherein the first encoder and the second encoder each correspond to different video codecs.

13. The system of claim 11, wherein the first encoder and the second encoder each correspond to the same video codec and the second encoder corresponds to the video codec adjusted for a higher computational complexity than that of the first encoder.

14. The system of claim 11, wherein determining the optimal encoding parameter value set comprises mapping parameter values from the first encoder to corresponding parameter values for the second encoder.

15. The system of claim 11, wherein analyzing the plurality of decoded segments comprises:
calculating a quality and a bitrate for each of the plurality of decoded segments; and
determining, by analyzing the plurality of decoded segments on a quality-bitrate plane, a convex hull for the one or more video segments, wherein the convex hull corresponds to performance boundaries for bitrates;
wherein the optimal encoding parameter value set for the one or more video segments is determined based on the convex hull.

16. A non-transitory computer-readable medium comprising one or more computer-executable instructions that, when executed by at least one processor of a computing device, cause the computing device to:
downsample and encode one or more video segments into a plurality of encoded segments with a first encoder using a plurality of encoding parameter value sets;
decode and upsample the plurality of encoded segments to a plurality of decoded segments at an original resolution of the one or more video segments;
analyze the plurality of decoded segments by determining an amount of degradation from the one or more video segments;
determine, for the first encoder based on the analysis of the plurality of decoded segments and corresponding video performance of the first encoder, an optimal encoding parameter value set of the first encoder for the one or more video segments; and
encode the one or more video segments with a second encoder using the optimal encoding parameter value set of the first encoder, wherein the second encoder performs a different encoding than the first encoder.

17. The non-transitory computer-readable medium of claim 16, wherein the first encoder and the second encoder each correspond to different video codecs.

18. The non-transitory computer-readable medium of claim 16, wherein the first encoder and the second encoder each correspond to the same video codec and the second encoder corresponds to the video codec adjusted for a higher computational complexity than that of the first encoder.

19. The non-transitory computer-readable medium of claim 16, wherein determining the optimal encoding parameter value set comprises mapping parameter values from the first encoder to corresponding parameter values for the second encoder.

20. The non-transitory computer-readable medium of claim 16, wherein analyzing the plurality of decoded segments comprises:
calculating a quality and a bitrate for each of the plurality of decoded segments; and
determining, by analyzing the plurality of decoded segments on a quality-bitrate plane, a convex hull for the one or more video segments, wherein the convex hull corresponds to performance boundaries for bitrates;
wherein the optimal encoding parameter value set for the one or more video segments is determined based on the convex hull.

* * * * *